Dec. 29, 1942.  J. HOFFMANN  2,306,477
FULLY AUTOMATIC FILTER PRESS
Filed Jan. 20, 1938  7 Sheets-Sheet 1
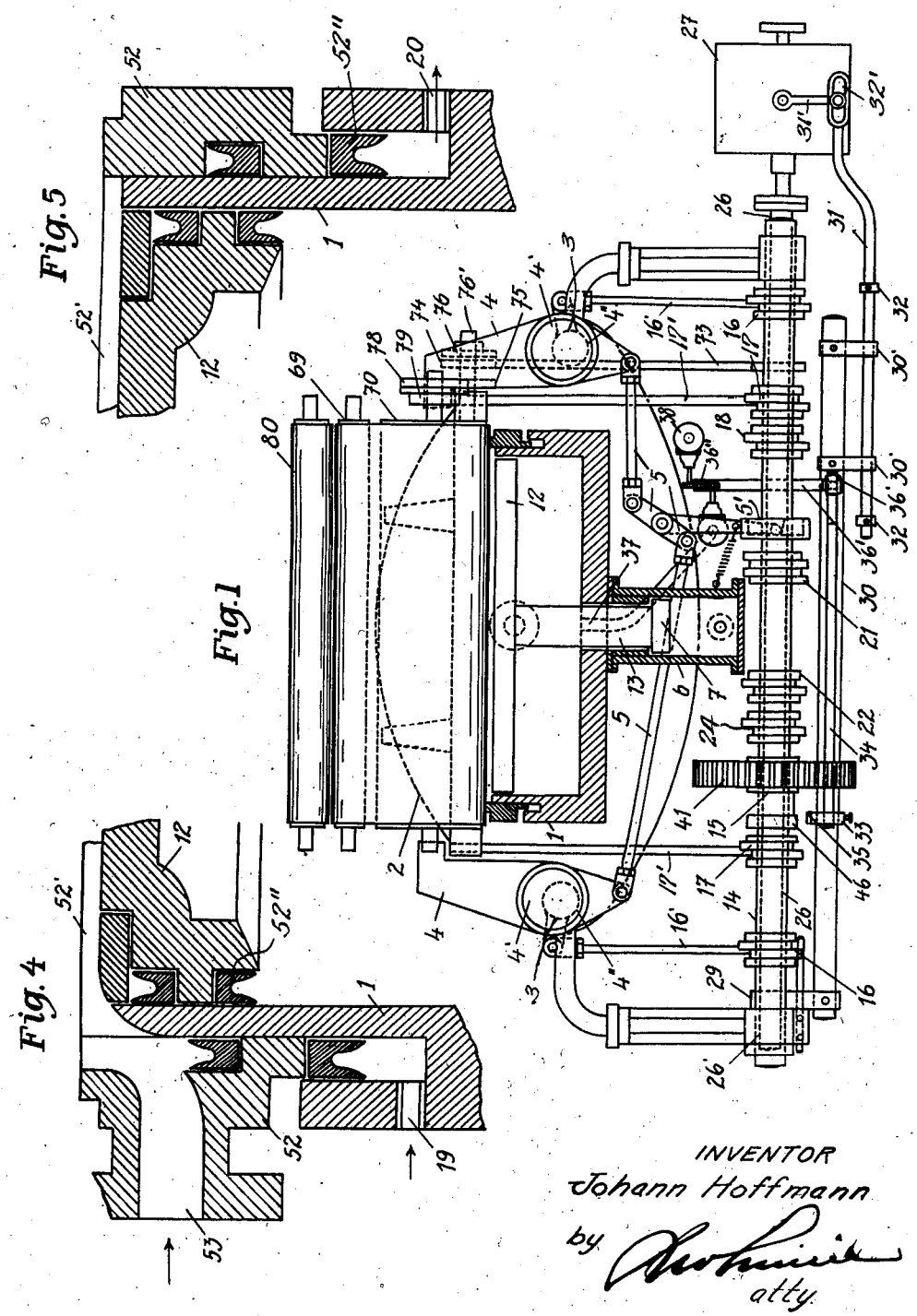
INVENTOR
Johann Hoffmann
by
atty.

Dec. 29, 1942. J. HOFFMANN 2,306,477
FULLY AUTOMATIC FILTER PRESS
Filed Jan. 20, 1938 7 Sheets-Sheet 2
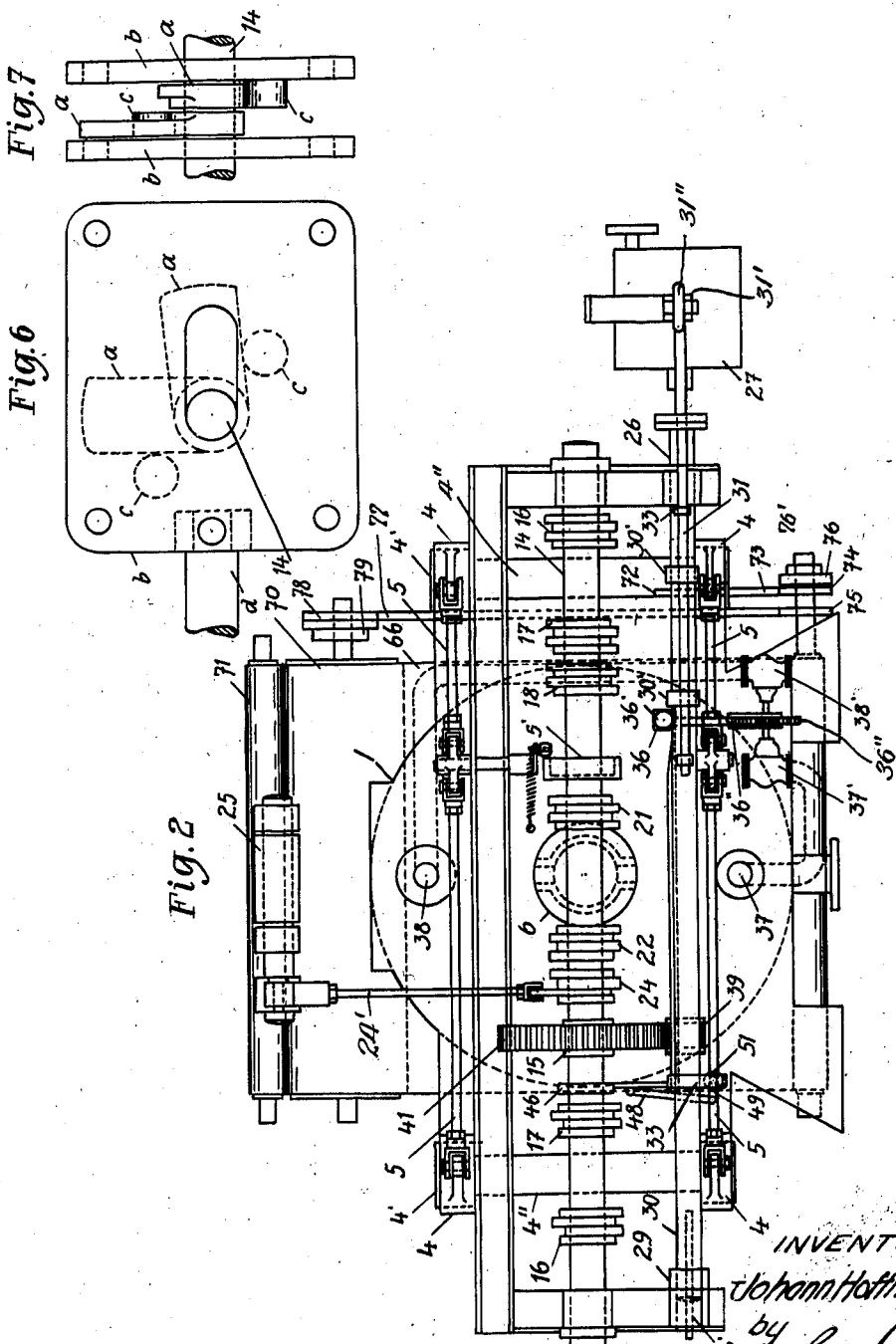
INVENTOR
Johann Hoffmann

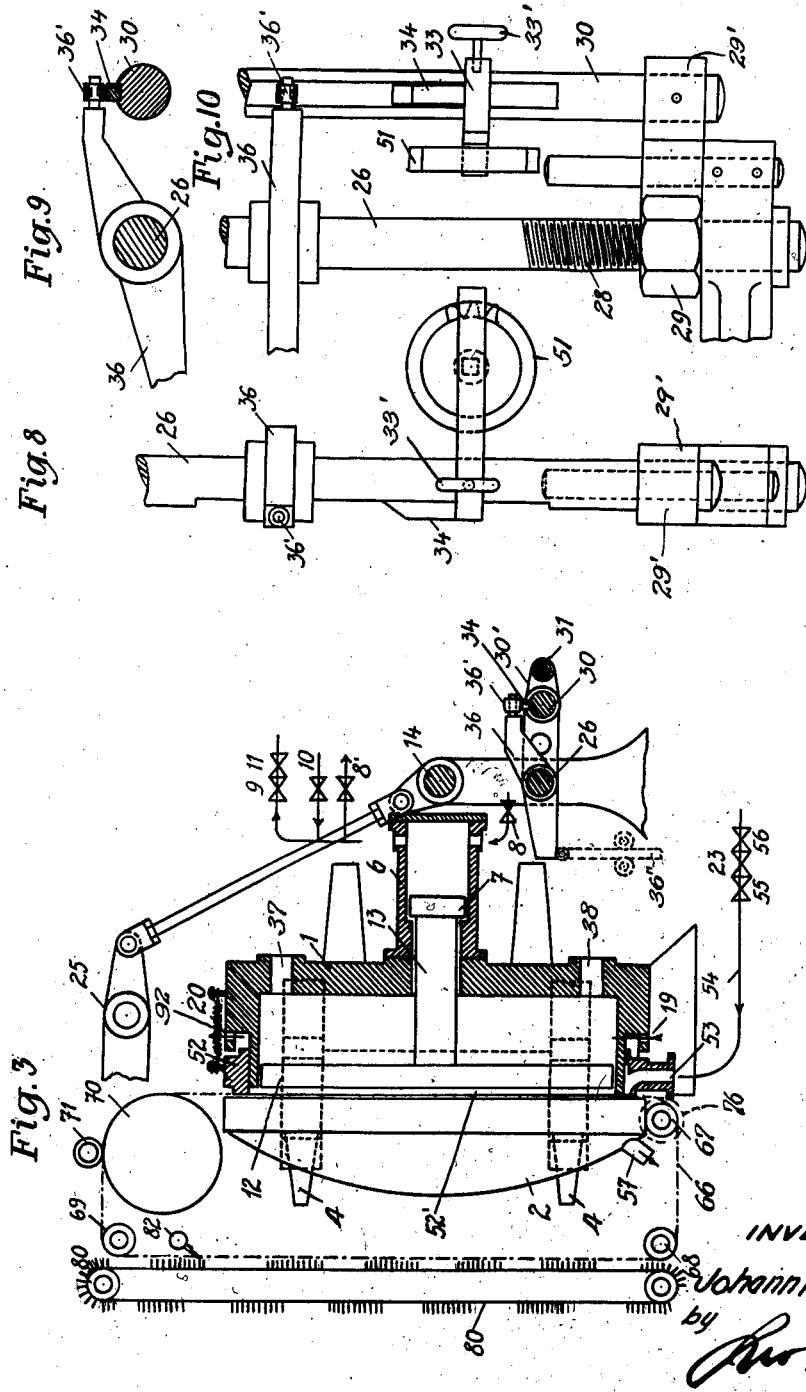

Dec. 29, 1942.  J. HOFFMANN  2,306,477
FULLY AUTOMATIC FILTER PRESS
Filed Jan. 20, 1938  7 Sheets-Sheet 4

INVENTOR
Johann Hoffmann
by
atty.

Dec. 29, 1942.   J. HOFFMANN   2,306,477
FULLY AUTOMATIC FILTER PRESS
Filed Jan. 20, 1938   7 Sheets-Sheet 5

Inventor
Johann Hoffmann
By

Dec. 29, 1942.  J. HOFFMANN  2,306,477
FULLY AUTOMATIC FILTER PRESS
Filed Jan. 20, 1938   7 Sheets-Sheet 6

Inventor
Johann Hoffmann
by [signature] Atty.

Dec. 29, 1942.   J. HOFFMANN   2,306,477
FULLY AUTOMATIC FILTER PRESS
Filed Jan. 20, 1938   7 Sheets-Sheet 7

Inventor
Johann Hoffmann
By
Atty

Patented Dec. 29, 1942

2,306,477

UNITED STATES PATENT OFFICE 2,306,477

FULLY AUTOMATIC FILTER PRESS

Johann Hoffmann, Vienna, Austria; vested in the Alien Property Custodian

Application January 20, 1938, Serial No. 186,001
In Austria January 20, 1937

4 Claims. (Cl. 100—50)

The invention relates to a filter apparatus combining an ordinary filter chamber with a hydraulic press, the preliminary filtration (effected solely under the pressure of supply of the liquid to be filtered), the subsequent hydraulic pressing of the contents of the filter chamber (press filtration) and the emptying of residue from the filter chamber taking place entirely automatically in repeated sequence. In known filter apparatus of this type, no provision is made for regulating, according to the nature of the liquid to be filtered, the time of activity both of the preliminary filtration and of the press filtration.

According to the present invention, for the purpose of adjusting the time of filtration, the moment of the completion thereof and the commencement of the emptying of residue from the press, an adjustable control member is arranged to be operated by the rotation of a driving shaft, and by means of this member the moment at which pressure fluid is to be admitted behind the press piston, on the one hand, and, on the other, the moments at which an intermittently operated device for emptying the press and refilling it with more liquid to be filtered for a fresh operation is to be coupled to and uncoupled from a driving shaft can be set as desired.

Thus, by the invention it is possible to maintain as long as desired the maximum pressure both for the preliminary filtration and for the subsequent hydraulic press filtration. The thickness of the press residue can be regulated to any desired value.

Preliminary filtration begins with the press piston under the counter-force of a plunger in an auxiliary cylinder, the press piston being advanced during each press filtration until the desired thickness of the press residue is attained.

Means are provided whereby a cleaned filtering medium (filter cloth or sieve fabric) is made available for every cycle of operation.

One constructional form of filter apparatus embodying the foregoing and other features of the invention is illustrated diagrammatically and by way of example on the accompanying drawings, to which reference will now be made.

Figure 1 is a plan of the apparatus, partly in section.

Figure 2 is a rear elevation of the apparatus.

Figure 3 is an end elevation of the apparatus, also partly in section.

Figures 4 and 5 show details of the press cylinder.

Figures 6 and 7 are two views, at right angles to one another, of one of the controls employed in the apparatus.

Figures 8, 9 and 10 show, in plan, section and elevation respectively, details of the driving shaft.

Figures 11, 11A:
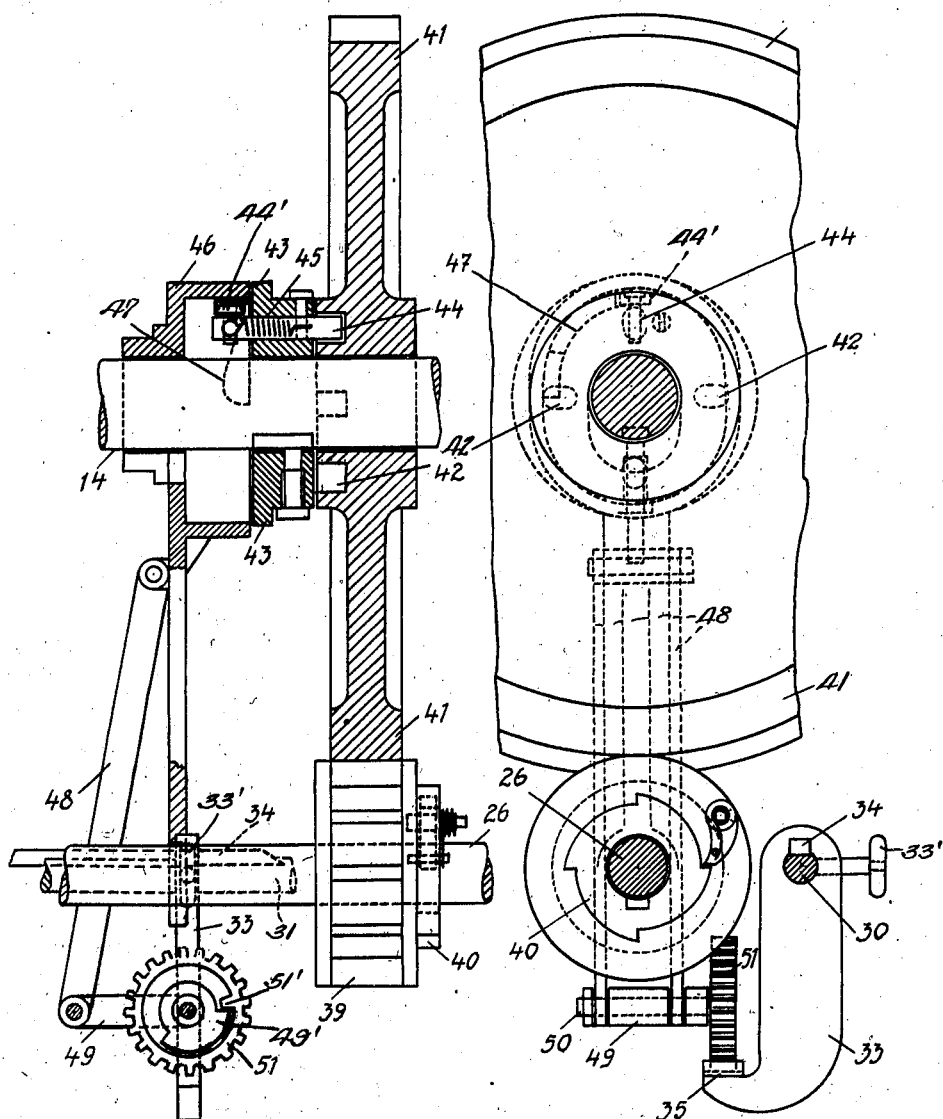
Figure 11 is a fragmentary view partly in section and partly in elevation and showing a certain driving mechanism and clutch means connecting drive and timing shafts used herein.
Figure 11a is a view of the parts shown in Figure 11 from the right side of the latter.
Figure 12:
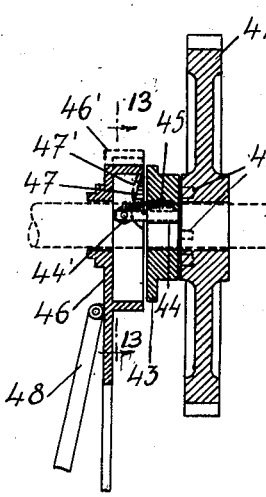
Figure 12 is a view of the upper part of Figure 11 with the parts unclutched.
Figure 13:
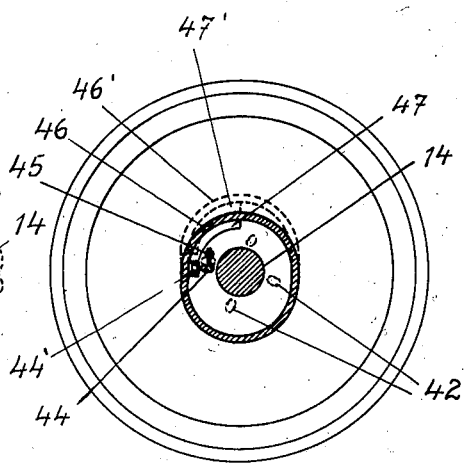
Figure 13 is a section on the line 13—13 of Figure 12.

The filter apparatus comprises a press cylinder 1 fitted with a cover 2 which is adapted to be closed and drawn tightly into position by rockable claws 4. The claws 4 are rotatable on the eccentrics 4' fixed on shafts 4'' journalled in suitable bearings on the frame of the apparatus. Rocking of the claws 4 is effected from a face cam 5' fixed on a control shaft 14 by means of the rod and link arrangement 5, and turning of the shafts 4'' with their eccentrics 4' is effected from control members 16 through rods 16'. By the appropriate turning of the shafts 4'' the claws 4 are caused, through the action of the eccentrics 4', to press tightly on the closed cover 2 and this, in turn, is tightly seated and sealed against the press cylinder 1.

At the rear of the cylinder 1 is mounted an auxiliary cylinder 6 fitted with a plunger 7 which is connected by a rod 13 with the press piston 12. Valves 8, 8', 9, 10 and 11 (Figure 3) are provided in a pressure fluid pipe line to and from the auxiliary cylinder 6. Of these 8 is the inlet valve, 8' the outlet valve, 9 a safety valve, 10 is a vacuum-breaking air inlet valve and 11 a regulating valve. The control shaft 14 is associated with a coupling 15, by means of which it is automatically and intermittently driven from a shaft 26 to perform a rotation of 360° in each case. On the shaft 14 are mounted slidable controls 16, 17, 18, 21, 22, 24, each of which (Figures 6 and 7) consists of two cams $a$ on the shaft 14, two slotted members $b$ through which the shaft passes, rollers $c$ on said members, and a rod $d$ connecting said members with the part to be controlled. These slidable controls, through the reciprocation of their slotted members $b$, control the movements to be performed at determined moments by various parts of the apparatus, with the aid of rod systems. Thus the controls 16 effect the turning of the eccentric shafts 3 carrying the closure claws 4 for the cover 2; the controls 17 effect through the rods 17' the forward (opening) and backward (closing) movement of said cover; the controls 18 effect the opening and closing of the inlet and outlet ports 19 and 20 (Figure 3) of a ring 52 fitted to the press cylinder 1 and hereinafter described; the controls 21 serve to open and shut the auxiliary cylinder valves 8 and 8'; the controls 22 serve to open an inlet valve 23 (Figure 3) for the liquid to be filtered; and the controls 24 operate through linkage 25, 25' a stripper 25'' for stripping off filter cake or residue adhering to the press piston 12.

The driving shaft 26 is rotated in alternate directions through a standard reversing gear the casing of which is shown at 27, the gear being located at one end of said shaft. Its other end 26' is screw-threaded at 28 (Figure 10) and carries a nut 29 which is integral with an arm 29' fixed on a rod 30. Consequently, on rotation of the driving shaft 26, the nut 29 is axially displaced and carries the rod 30 with it. The rod 30 has arms 30', 30' slidably engaging a thrust rod 31 (Figure 1) having adjustable abutments 32 for said arms, whereby at the proper times the thrust rod is caused to operate the reversing gear 27 through the medium of a reversing lever 31' having pin and slot connection 31'' with said rod 30.

Adjustably positioned on the rod 30 is a ramp on cam 34 tapered at one end as shown. This ramp is associated with an arm 33 adjustably secured to the rod 30 by a set screw 33'. On the driving shaft 26 is rotatably mounted a two-armed lever 36 (Figure 9) whose one end carries a roller 36' resting on the rod 30. On axial displacement of said rod 30 and ramp 34 the latter engages the roller 36' thereby rocking the lever 36 and thus operating, by means of a suitable member (such as a rack 36''), valves 37', 38' which control the outlet and inlet of pressure fluid into the cylinder 1 behind the piston 12 through passages 37 and 38 respectively. By adjustment of the arm 33 with the ramp 34, the opening and closing of the aforesaid valves and thus the time of transition from the prefiltration to the subsequent press filtration may be adjusted as desired.

The aforesaid coupling 15 (Figures 1 and 2) by means of which rotation is transmitted intermittently from the driving shaft 26 to the control shaft 14, each such rotation of the latter comprising 360°, consists of the following parts illustrated in Figures 11, 11a, 12, 13, 14 and 15). On the driving shaft 26 is loosely mounted a pinion 39 having a pawl engaging a ratchet wheel 40 keyed on to the said shaft, said pinion meshing with a gear wheel 41 mounted revolubly on the control shaft 14. The hub of the gear wheel 41 has at one side four recesses 42, and a drive block 43 is secured to the control shaft 14 at this side. In this block is slidably mounted a plunger bolt 44 which can enter any of the recesses 42 under the action of a tension spring 45. A hood 46 is loosely mounted on the shaft 14 so that it can be raised and lowered relative thereto, and is connected by lever and links 48 to a rocker 49' keyed on the shaft 50 whereto the lever 49 is also fixed. The rocker 49' is surrounded by an annular external gear 51 shiftable around the rocker and having an internal lug 51' which, upon rotation of the gear in one direction or the other, engages the rocker to rock the same in a corresponding direction. Said hood 46 has a cam 47 arranged to cooperate with the plunger bolt 44 of the drive block in order to withdraw it at certain times from driving connection with the gear wheel 41. On rotation of the shaft 26 in one direction, the beforementioned arm 33, which has a rack 35, is moved by the axial displacement of the nut 29 to cause the rack to engage the gear wheel 51 and rotate the latter.

Thereby the rocker 49' is rocked to move the lever 49 and the hood 46 is lifted (to the position 46', Figures 12 and 13) by the links 48. Thus the cam 47 is displaced (to the position 47') to allow the roller 44', under the action of the spring 45, to move along the cam to drop off its high end so that the bolt 44 enters the next of the four recesses 42 in the gear wheel 41 coming into alignment with said bolt. The greater the number of recesses the quicker the bolt 44 is engaged and the shorter is the time lost between couplings. The gear wheel 41, which is driven by the pinion 39, the latter being driven by the ratchet wheel 40 fixed on the shaft 26, then transmits the drive to the control shaft 14 through the medium of the bolt 44 and block 43. After the short rack 35 of the arm 33 has passed the cam gear wheel 51, the hood 46 returns automatically to the position shown in full lines in Figures 12 and 13. During the last quarter of the rotation of the shaft 14 through 360° the roller 44' again engages the cam 47 and rides up from its low to its high point, whereupon the bolt 44 is displaced out of the engaged recess 42 in the gear wheel 41 and the shaft 14 is brought to rest so soon as the roller reaches the position shown in Figure 12.

Around the cylinder 1 is located a displaceable ring 52, which forms a preliminary chamber 52' about 3–20 mm. in depth, in front of the press piston 12 which can be moved forward until its face is flush with the cylinder edge. At the commencement of the filtering operation this ring makes a tight joint between the cylinder 1 and the cover 2 in that pressure fluid admitted at 19 (Figures 3, 4 and 5) acts on the packing 52'' at the rear of the ring. When the ring 52 is relieved of this fluid pressure it is drawn backwards by springs (shown diagrammatically at 92 in Figure 3). At the bottom of the ring 52 is located an inlet 53 for the medium to be filtered connected to the supply line 54. In the latter are provided a non-return valve 55, a cut-off valve 23 controlled positively (by the control member 22) and a regulating valve 56.

Figure 14:
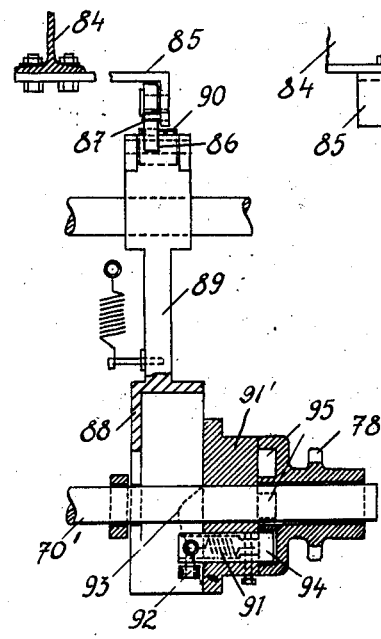
Figure 14 is a view somewhat similar to Figure 11 but showing the clutch associated with certain cleaning means used herein.
Figure 15:
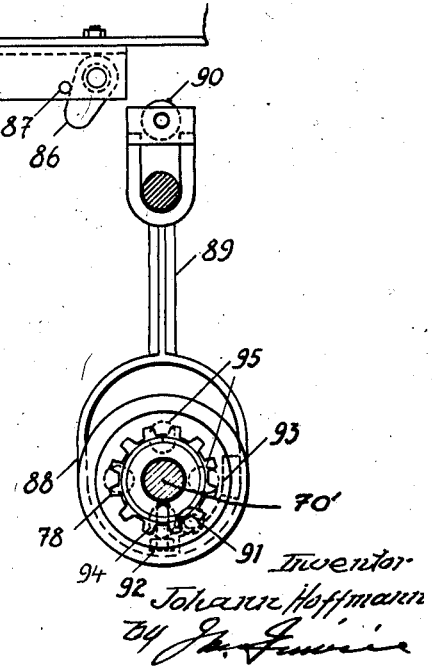
Figure 15 is a view from the left side of Figure 14.

Surrounding the cover 2 (Figure 3) is an endless band of a suitable filtering medium 66, such as filter cloth or sieve fabric, this band being guided over rollers 67, 68, 69 and 70. A roller 71 acts as pressure roller on the roller 70. A chain wheel 72 is keyed to the driving shaft 26 and drives, through a chain 73, chain wheels 74, 75, 76 mounted on a common shaft 76' (Figure 2). The chain wheel 75, through a chain 77, drives the chain wheel 78 of a coupling 79, which acts similarly to the above described coupling 15, i. e., permitting on each occasion a rotation of the transport roller 70 by 360° only. The periphery of the latter is equal to the diameter of the cylinder 1, so that a precleaned portion of the filtering band 66 is positioned between the cover 2 and cylinder 1 after each filtering operation. Figures 14 and 15 show the coupling through which the transport roller 70 receives on each occasion a rotation of 360°. The chain wheel 78 of the coupling is revoluble on the roller shaft 70' and is continuously driven from the chain wheel 75 (Figure 2). On the framework of the filter apparatus upper longitudinal bearers 84 are secured. On these bearers run rollers (not shown) from which the cover 2 is suspended. To one of these bearers 84 is bolted an angle plate 85 on which is mounted a swinging cam arm 86 freely movable in one direction but restrained in the opposite sense by a fixed abutment or stop 87. The sleeve or hood 88 of the coupling is connected with a rod 89 which is suitably guided for upward and downward movements and which carries at its upper end a roller 90 adapted on the opening movement of the cover 2 to come into the path of the arm 86. The rod 89 and the sleeve 88 are urged downwardly whenever the roller 90 contacts the arm 86 when moving in one direction, the arm being prevented from swinging by the fixed abutment 87. The downward movement of the hood 88 causes a cam 93 integral with the hood to be moved clear of a roller 92 carried by a bolt 94 sliding in a member 91' fixed on the roller shaft 70', and the bolt, under the action of a spring 91, then engages one of a number of recesses 95 in the hub of the chain wheel 78. Consequently the transport roller 70 is turned 360°. On the return movement of the cover 2 the arm 86 simply trips the roller 90. The filtering medium is cleaned by a continuously rotating brush band 80, with or without water swilling at 82. The brush band 80 is driven by the chain wheel 76.

Figure 16:
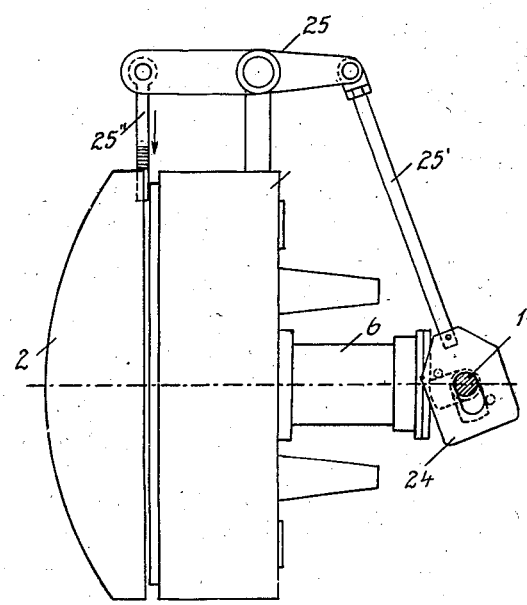
Figures 16 and 17 show in vertical section and in elevation respectively, a coupling for the cleaning means for the filtering medium.
Figure 17:
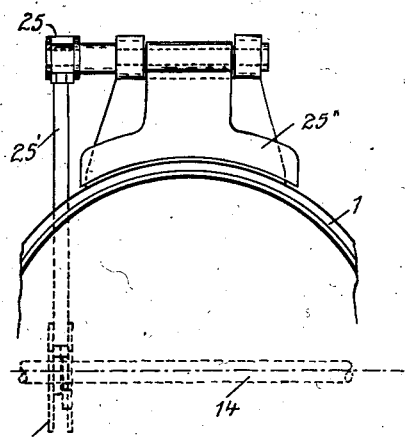

The stripper (Figures 16 and 17) comprises a two-armed lever 25, one arm of which is connected by a rod 25' with the control member 24 on the shaft 14 and the other arm has connected thereto the actual stripping member 25". Immediately the first mentioned lever arm is raised by the control rod 25', the stripping member is moved downwards in the direction of the arrow to strip off filter cake or residue adhering to the press piston 12.

Figure 18:
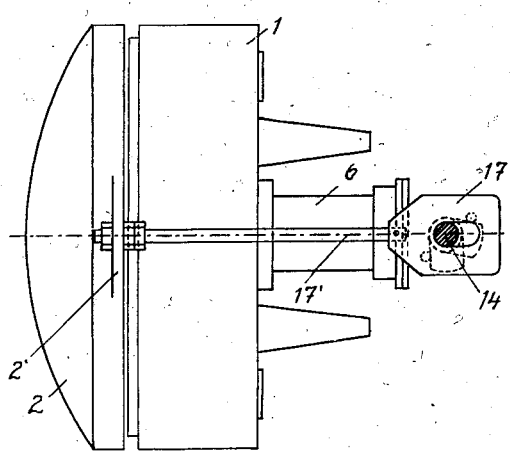
Figures 18 and 19 show plan and side elevations respectively of the linkage for the operation of the cover.
Figure 19:
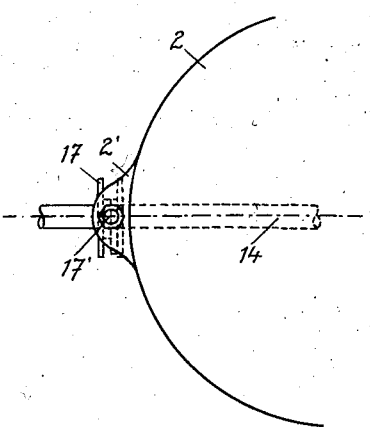

Figures 18 and 19 show linkage for the operation of the cover 2. Control 17 is slidably mounted on the control shaft 14 and connected by a rod 17' with shoulders 2' provided on both sides of the cover 2. The ends of the said rods are threaded and the shoulders 2' are fixed by nuts. When shaft 14 makes one turn (revolution) the cover by the forward movement of the rods 17' is opened once and also closed by the backward movement of the rods.

Figure 20:
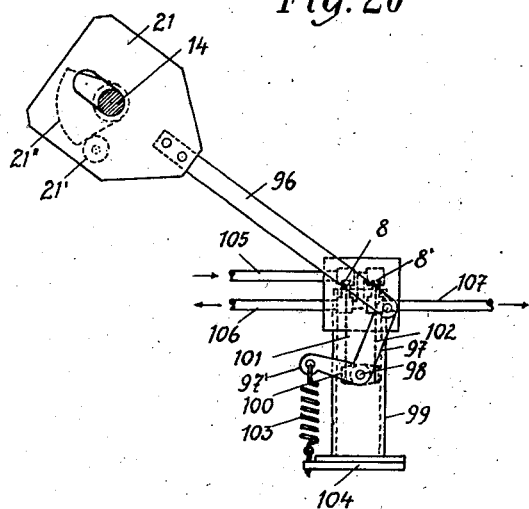
Figure 20 is a view in elevation showing the linkage for the operation of the valves.

Figure 20 shows the linkage and operation of valves 8 and 8' which are united as a two-spindled valve in one casing. On the shaft 14 is mounted the slidable control 21 which is connected by rod 96 and angle-lever 97 with the axis 98 mounted on a standard 99. The angle lever 97 and a lever 100 are in fixed connection with the axis of rotation 98 and therefore make all revolutions together. Each arm of lever 100 is connected with one spindle 101 and 102 respectively so that when lever 100 is rotated, one spindle is forced up and the valve is opened, while the other spindle is lowered and the cooperating valve closed. The free arm 97' of the angle lever 97 is connected with one end of draw-spring 103, which spring is secured to plate 104. Pressure fluid is conducted through tube 105 from the accumulator or the like and through tube 106 to the cylinder room behind the auxiliary plunger 7. 107 is the delivery pipe. When the control shaft 14 begins its revolution, the valve 8 is closed and the valve 8' is opened, so that the pressure fluid flows from the room behind the auxiliary plunger 7 through tube 106, valve 8' and delivery pipe 107. When the rollers 21' of the control 21 move out of contact with the cam 21", the drive of the spring 103 closes automatically valve 8'. Now the pressure fluid flows from the accumulator or the like through tube 105, valve 8 and tube 106 in the room behind the auxiliary plunger 7.

Parts 19 and 20 are also united in a two-spindle valve in one casing of same construction and operate in the same manner as valves 8 and 8'.

Figure 21:
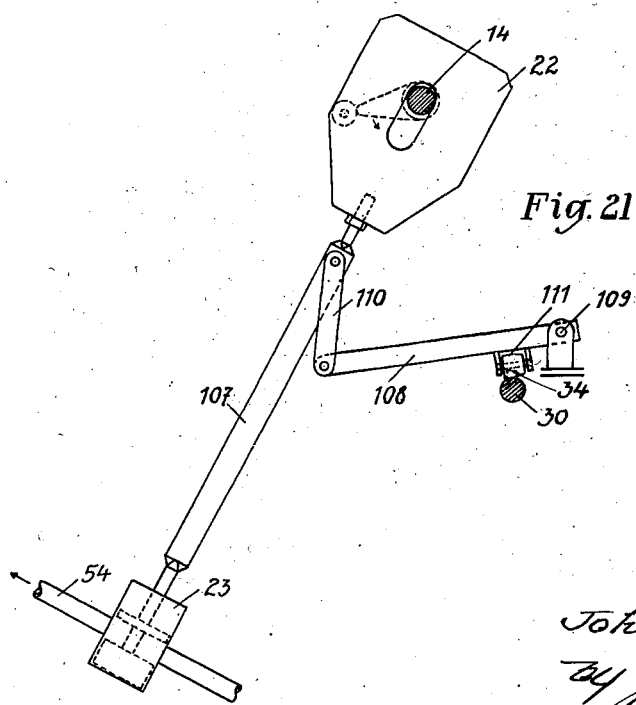
Figure 21 is a view in elevation showing the linkage for the operation of the inlet valve.

Figure 21 shows linkage and operation of inlet valve 23 for the liquid to be filtered. On the shaft 14 is mounted the slidable control 22 which is connected by rod 107 and spindle with the plungers of the cylinder valve 23. 54 is the tube for conducting the liquid to be filtered into the space 52' between the cover 2 and the piston 12 (Figure 3). A one-armed lever 108 rotatable around the fixed axis 109 is connected by a joint arm 110 with the rod 107. The lever 108 carries on its lower side a roller 111, resting on the rod 30 and ramp 34 positioned on rod 30. On axial displacement of said rod 30 and ramp 34 the latter engages the roller 111 thereby to rock the lever 108 and thus operates by means of joint arm 110 and control rod 107 valve 23. When the shaft 14 finishes its revolution, valve 23 is opened and liquid to be filtered is forced into the filter chamber 52'. When during the axial movement of rod 30, the roller 111 runs up on the ramp 34, the lever 108 is rocked to close the inlet valve 23.

The fully automatic filter apparatus described works as follows:

The liquid to be filtered is forced by a pump through the line 54, through the valves 56, 23 and 55, and through the branch 53, into the space 52' between the cover 2 and the piston 12. Against the pressure force thus acting on the face of the piston 12 there acts as a counterforce hydraulic pressure applied to the plunger 7 in the auxiliary cylinder 6 and interrupted only during the opening of the cover 2. The filtering thus starts immediately, a pressure of, for example, 5 kilos per square cm. prevailing in the filter chamber. The hand regulating valves 56 and 11 permit the most extensive regulation of the prefiltration. The time thereof and of the subsequent press filtration may be regulated in the aforedescribed manner by adjustment of the arm 33 on the rod 30 and of the abutments 32 on the rod 31, according to the desired change-over of the reversing gear. The lever 36, rocked in consequence of the displacement of the ramp 34, effects the opening and closing of the valves controlling the inlet and outlet of pressure fluid into and out of the cylinder 1 at 37 and 38 respectively. With the commencement of the hydraulic press filtration in consequence of the opening of the inlet valve at 37 and entry of pressure fluid into the cylinder space behind the piston 12, the non-return valve 55 closes and the supply of liquid to be filtered is interrupted. As the hydraulic pressing is completed (which happens at the moment when the roller on the lever 36 runs up on the ramp 34, whereby the lever 36 is rocked to close the inlet valve 37 and open the outlet valve 38) the coupling is engaged, by means of the rack 35 which shares the movement of the arm 33 and actuates the hood 46 (Figure 11), and causes one complete revolution of the control shaft 14, then to be automatically disconnected once more in the manner described above.

During a complete revolution of the control shaft 14 the following operations are carried out in succession:

The inlet valve 23 for the liquid to be filtered is closed. By the control 21 the valve 8 for the inlet of pressure fluid behind the auxiliary plunger 7 is closed and the valve 8' opened. (The closing of the valve 8 is effected in order to permit the opening of the cover 2, while through the opening of the valve 8' the pressure in the auxiliary cylinder 6 is relieved. By the controls 16 the eccentric shafts 3 are turned forward and by the stepped pulley 5' the claws 4 are moved clear of the cover 2. Then, by the controls 17 the cover is moved forward (opened). After the cover is opened, it remains open for a suitable space of time. The control 18 opens the outlet 20 and closes the inlet 19 behind the ring 52 whereupon this ring is drawn back by springs during the ejection of the press residue which now takes place. Further during the time the cover remains open, the control 24 operates the stripper 25 for stripping off the press residue adhering to the piston 12. When the press residue has been removed, the coupling 79 on the transport roller 70 is engaged in order to bring a cleaned part of the filtering band into position for the next filtration. By the controls 17 the cover is replaced and by the stepped pulley 5' the claws 4 are rocked back into the locking position, and by the controls 16 the eccentric shafts 3 are turned back on to their dead centers to press the cover firmly against the cylinder 1. Then the control 18 closes the valve 20 and opens the valve 19 in order to push forward the ring 52 to operative position again. Moreover, under the action of the control 21 the valve 8' is closed and the valve 8 is opened and lastly, by the control 22, the inlet valve 23 is opened, whereupon, under the action of the supply pump, further liquid to be filtered is forced into the filter chamber 52' and a fresh cycle of operations begins.

While the machine is closed, the filtering band is continuously cleaned.

What is claimed to be new is:

1. In an automatic press, a pressing chamber having an open end, an actuating cylinder connected thereto, a pressing piston movable in said chamber, an actuating piston in said cylinder and having a stem connected to the pressing piston, a head for said chamber movable toward and from the open end thereof, latches swingingly engageable with and disengageable from said head, movable pivot means supporting said latches to cause the latches when engaged to urge the head towards the chamber and permit the latches to move with the head away from the chamber, a timing shaft, and cams on said shaft operatively connected to said head, pivots and latches for moving the same in timed relation.

2. The press of claim 1 characterized by having a drive shaft operatively connected to the timing shaft to effect intermittent rotation of the latter through 360°.

3. The press of claim 1 characterized by having a valve controlled inlet and a valve controlled outlet for admitting and exhausting pressure fluid from behind the pressure piston, a drive shaft means for operatively connecting the drive shaft and timing shafts to cause intermittent rotation of the latter, and an operative connection between said valves and driving shaft controlling said valves in timed relation to the head and latches.

4. The press of claim 1 characterized by having a valve controlled inlet and a valve controlled outlet for admitting and exhausting pressure fluid from behind the pressure piston, a drive shaft means for operatively connecting the drive shaft and timing shafts to cause intermittent rotation of the latter, an operative connection between said valves and driving shaft controlling said valves in timed relation to the head and latches, and means to adjust the timing of the valve operative means.

JOHANN HOFFMANN.